US007535840B2

(12) United States Patent
Kurihara

(10) Patent No.: US 7,535,840 B2
(45) Date of Patent: May 19, 2009

(54) INFORMATION PROCESSING APPARATUS AND METHOD, RECORDING MEDIUM, AND PROGRAM

(75) Inventor: Kuniaki Kurihara, Tokyo (JP)

(73) Assignee: Sony Corporation, Tokyo (JP)

( * ) Notice: Subject to any disclaimer, the term of this patent is extended or adjusted under 35 U.S.C. 154(b) by 922 days.

(21) Appl. No.: 10/080,317

(22) Filed: Feb. 21, 2002

(65) Prior Publication Data

US 2002/0141406 A1     Oct. 3, 2002

(30) Foreign Application Priority Data

Feb. 21, 2001     (JP)     ............... P2001-045250

(51) Int. Cl.
  *H04L 1/00*     (2006.01)
(52) U.S. Cl. ................... 370/230.1; 714/748
(58) Field of Classification Search ................ 714/748; 370/231, 428, 473
  See application file for complete search history.

(56) References Cited

U.S. PATENT DOCUMENTS

| | | | | |
|---|---|---|---|---|
| 4,628,504 A * | 12/1986 | Brown | ........................ | 370/458 |
| 5,109,384 A * | 4/1992 | Tseung | ........................ | 714/748 |
| 5,285,449 A * | 2/1994 | Georgiou | .................... | 370/360 |
| 5,666,484 A * | 9/1997 | Orimo et al. | ................... | 714/18 |
| 5,797,094 A * | 8/1998 | Houde et al. | ............. | 455/412.2 |
| 6,112,096 A * | 8/2000 | Hasegawa | ................... | 455/458 |
| 6,172,988 B1 * | 1/2001 | Tiernan et al. | .............. | 370/473 |
| 6,275,495 B1 * | 8/2001 | Mazzaglia et al. | ....... | 370/395.5 |
| 6,392,993 B1 * | 5/2002 | Hamilton et al. | ............ | 370/230 |
| 6,483,845 B1 * | 11/2002 | Takeda et al. | ............... | 370/429 |
| 6,640,325 B1 * | 10/2003 | Fischer | ...................... | 714/748 |
| 6,678,523 B1 * | 1/2004 | Ghosh et al. | ................ | 455/442 |
| 6,721,707 B1 * | 4/2004 | Chu et al. | ................... | 704/500 |
| 6,765,871 B1 * | 7/2004 | Knobel et al. | ............... | 370/231 |
| 6,804,244 B1 * | 10/2004 | Anandakumar et al. | | 370/395.21 |
| 6,854,020 B1 * | 2/2005 | Kamihara et al. | ............. | 710/1 |
| 6,895,019 B2 * | 5/2005 | Gibson et al. | ............... | 370/473 |
| 2002/0012337 A1 * | 1/2002 | Schmidl et al. | ............. | 370/349 |
| 2004/0098657 A1 * | 5/2004 | Jalali et al. | .................. | 714/758 |

\* cited by examiner

*Primary Examiner*—Chi H Pham
*Assistant Examiner*—Mohammad S Adhami
(74) *Attorney, Agent, or Firm*—Sonnenschein Nath & Rosenthal LLP

(57) ABSTRACT

Information can be transferred while ensuring real-time characteristics without increasing the circuit size of an apparatus. A high-order layer packet is divided into a plurality of fragmented packets of fragment numbers, and these are transmitted via a wireless network. When an error occurs, if within a maximum permissible transmission process time, the fragmented packet of the same fragment number is retransmitted. For the high-order packet, since all the fragmented packets thereof could not be transmitted within that time due to the error, a halt flag is written into the fragmented packet of the next high-order packet.

12 Claims, 9 Drawing Sheets

INFORMATION PROCESSING APPARATUS AND METHOD, RECORDING MEDIUM, AND PROGRAM

RELATED APPLICATION DATA

The present application claims priority to Japanese Application(s) No(s). P2001-045250 filed Feb. 21, 2001, which application(s) is/are incorporated herein by reference to the extent permitted by law.

BACKGROUND OF THE INVENTION

1. Field of the Invention

The present invention relates to an information processing apparatus and method, a recording medium, and a program. More particularly, the present invention relates to an information processing apparatus and method, a recording medium, and a program in which information can be transmitted or received more reliably while ensuring real-time characteristics without decreasing transmission efficiency.

2. Description of the Related Art

Generally, in packet communication in a communication line in which the risk of packet transmission errors and packet loss is high, in order to maintain the reliability of the contents of the communication, an automatic repeat request (ARQ) method is often used.

In this ARQ method, as is disclosed in Japanese Unexamined Patent Application Publication No. 11-284607, when the transmission side transmits a packet and, thereafter, receives a notification from the receiving side indicating that the transmitted packet is received, the transmission side transmits the next packet. However, when the transmission side cannot receive a notification from the receiving side indicating that the transmitted packet is received, the transmission side repeats the process of retransmitting the same packet.

This ARQ method ensures the reliability of packet distribution in communication and is a method suitable for bulk data distribution of electronic mail, a file transfer application, etc., for which the transmitted information needs to be reliably received by the receiving side.

However, according to the ARQ method, when the packet cannot be received by the receiving side, since the operation of retransmitting the same packet is repeated, it is difficult to maintain real-time characteristics.

Furthermore, when an application program which requires real-time characteristics cannot receive a packet via a network even when waiting is performed for a time exceeding a permissible range, assuming that that packet is lost, it is necessary to process packets which follow. However, in the ARQ method, since the packet is retransmitted even in such a case, the retransmission process is performed even for a packet which is determined to exceed the permissible range in the application (receiving side), with the result that a problem arises in that the transmission bandwidth of the network and the memory of the receiving side are wasted.

For this reason, for example, in a wired network with a low error rate such as an optical-fiber network, since reliable packet distribution can be expected, real-time characteristics are ensured by using a protocol, such as UDP (User Datagram Protocol), which does not have a packet retransmission mechanism.

However, since a wireless network has a relatively high data error rate in comparison with a wired network, it is difficult to use a protocol, such as UDP, which does not have reliable packet distribution. Therefore, in a wireless network, lost packets are restored in the receiving side by using an FEC (Forward Error Correction) method capable of restoring packets in the receiving side.

However, in this FEC method, in comparison with the ARQ method, not only is the size of the processing circuit increased, but also error-correction information must be added to the packets. As a result, a problem arises in that redundancy occurs and the transmission efficiency is substantially decreased.

SUMMARY OF THE INVENTION

The present invention has been made in view of such circumstances, and aims to ensure real-time characteristics and to prevent transmission efficiency from being decreased.

To this end, according to a first aspect, the present invention provides an information processing apparatus comprising: first transmission means for transmitting first information to a transmission party via a network in units; receiving means for receiving, from the transmission party, receiving information about the reception of the first information transmitted by the first transmission means; clocking means for clocking the time from when the first information is transmitted; determination means for determining whether or not the time clocked by the clocking means exceeds a reference value; and second transmission means for retransmitting the first information when the determination means determines that the time clocked by the clocking means does not exceed the reference value and for transmitting second information when the determination means determines that the time clocked by the clocking means exceeds the reference value, in a case where the received information received by the receiving means indicates that the transmission party has not yet received the first information.

The units may be packets.

The information processing apparatus may further comprise dividing means for dividing information for each first packet into information for each second packet, wherein the first and second transmission means transmit the information by using the second packet as units.

The information processing apparatus may further comprise setting means for setting a flag indicating that the time clocked by the clocking means exceeds the reference value when determined by the determination means.

The information processing apparatus may further comprise writing means for writing the flag into the second information which is transmitted by the second transmission means when the flag is set by the setting means; and clearing means for clearing the flag when all of the second packets which form one of the first packets are transmitted to the transmission party.

According to a second aspect, the present invention provides an information processing method comprising: a first transmission step of transmitting first information to a transmission party via a network in units; a receiving step of receiving, from the transmission party, receiving information about the reception of the first information transmitted in the first transmission step; a clocking step of clocking the time from when the first information is transmitted; a determination step of determining whether or not the time clocked in the clocking step exceeds a reference value; and a second transmission step of retransmitting the first information when the determination step determines that the time clocked in the clocking step does not exceed the reference value and for transmitting second information when the determination step determines that the time clocked in the clocking step exceeds the reference value, in a case where the received information received in the receiving step indicates that the transmission party has not yet received the first information.

According to a third aspect, the present invention provides a recording medium having recorded thereon a computer-readable program, the program comprising: a first transmission step of transmitting first information to a transmission party via a network in units; a receiving step of receiving, from the transmission party, receiving information about the reception of the first information transmitted in the first transmission step; a clocking step of clocking the time from when the first information is transmitted; a determination step of determining whether or not the time clocked in the clocking step exceeds a reference value; and a second transmission step of retransmitting the first information when the determination step determines that the time clocked in the clocking step does not exceed the reference value and for transmitting second information when the determination step determines that the time clocked in the clocking step exceeds the reference value, in a case where the received information received in the receiving step indicates that the transmission party has not yet received the first information.

According to a fourth aspect, the present invention provides a program comprising: a first transmission step of transmitting first information to a transmission party via a network in units; a receiving step of receiving, from the transmission party, receiving information about the reception of the first information transmitted in the first transmission step; a clocking step of clocking the time from when the first information is transmitted; a determination step of determining whether or not the time clocked in the clocking step exceeds a reference value; and a second transmission step of retransmitting the first information when the determination step determines that the time clocked in the clocking step does not exceed the reference value and for transmitting second information when the determination step determines that the time clocked in the clocking step exceeds the reference value, in a case where the received information received in the receiving step indicates that the transmission party has not yet received the first information.

According to a fifth aspect, the present invention provides an information processing apparatus comprising: receiving means for receiving the information transmitted for each second packet via a network; storage means for storing, for each first corresponding packet, information for each of the second packets received by the receiving means; assembling means for assembling information for each of the second packets stored in the storage means into information for each of the first packets before being divided; first deletion means for deleting the second packet, stored in the storage means, corresponding to the first assembled packet when the second packet is assembled into the first corresponding packet by the assembling means; determination means for determining whether or not a predetermined flag is contained in the information received by the receiving means; and second deletion means for deleting the second packet, stored in the storage means, corresponding to the first packet which is prior to the first packet to which the second packet in which the flag is contained corresponds when the determination means determines that the flag is contained in the information received by the receiving means.

According to a sixth aspect, the present invention provides an information processing method comprising: a receiving step of receiving information transmitted for each second packet via a network; a storing step of storing, for each first corresponding packet, information for each of the second packets received in the receiving step; an assembling step of assembling information for each of the second packets, stored in the storing step, into information for each of the first packets before being divided; a first deletion step of deleting the second packet, stored in the storing step, corresponding to the first assembled packet when the second packet is assembled into the first corresponding packet in the assembling step; a determination step of determining whether or not a predetermined flag is contained in the information received in the receiving step; and a second deletion step of deleting the second packet, stored in the storing step, corresponding to the first packet which is prior to the first packet to which the second packet in which the flag is contained corresponds when the determination step determines that the flag is contained in the information received in the receiving step.

According to a seventh aspect, the present invention provides a recording medium having recorded thereon a computer-readable program, the program comprising: a receiving step of receiving information transmitted for each second packet via a network; a storing step of storing, for each first corresponding packet, information for each of the second packets received in the receiving step; an assembling step of assembling information for each of the second packets, stored in the storing step, into information for each of the first packets before being divided; a first deletion step of deleting the second packet, stored in the storing step, corresponding to the first assembled packet when the second packet is assembled into the first corresponding packet in the assembling step; a determination step of determining whether or not a predetermined flag is contained in the information received in the receiving step; and a second deletion step of deleting the second packet, stored in the storing step, corresponding to the first packet which is prior to the first packet to which the second packet in which the flag is contained corresponds when the determination step determines that the flag is contained in the information received in the receiving step.

According to an eighth aspect, the present invention provides a program comprising: a receiving step of receiving information transmitted for each second packet via a network; a storing step of storing, for each first corresponding packet, information for each second packet received in the receiving step; an assembling step of assembling information for each of the second packets, stored in the storing step, into information for each of the first packets before being divided; a first deletion step of deleting the second packet, stored in the storing step, corresponding to the first assembled packet when the second packet is assembled into the first corresponding packet in the assembling step; a determination step of determining whether or not a predetermined flag is contained in the information received in the receiving step; and a second deletion step of deleting the second packet, stored in the storing step, corresponding to the first packet which is prior to the first packet to which the second packet in which the flag is contained corresponds when the determination step determines that the flag is contained in the information received in the receiving step.

According to the information processing apparatus and method, and the program in accordance with the first aspect of the present invention, in a case where the transmission party does not yet receive first information, when the clocked time does not exceed a reference value, the first information is retransmitted, and when the clocked time exceeds the reference value, the second information is transmitted. Therefore, information can be transmitted while ensuring real-time characteristics. Furthermore, even if a code for error detection is added, a code for error correction is not necessary. As a result, the increased overhead of the format of transmission data, substantially decreased data transmission efficiency, increased size of the processing circuit and increased cost can be prevented.

According to the information processing apparatus and method, and the program in accordance with the second aspect of the present invention, when a predetermined flag is contained in the received information, a stored second packet, corresponding to the first packet which is prior to the first packet to which the second packet in which the flag is contained corresponds, is deleted. Therefore, it becomes possible to reduce the wasteful consumption of resources.

DESCRIPTION OF THE PREFERRED EMBODIMENTS

Figure 1:
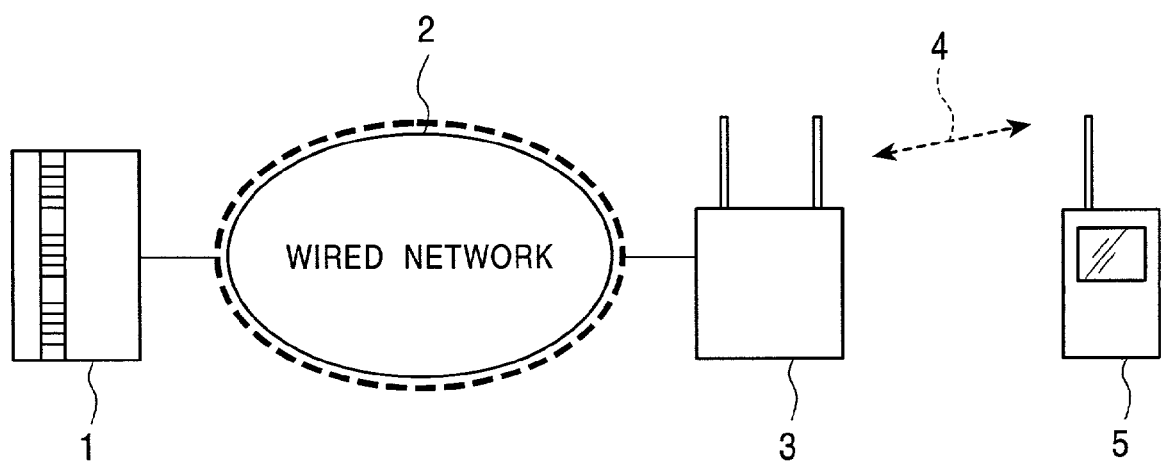
FIG. 1 shows an example of the configuration of a network system to which the present invention is applied.

FIG. 1 shows an example of the configuration of a network system to which the present invention is applied. In the example of this configuration, a server 1 and a wireless base station 3 are connected to a wired network 2. A wireless terminal 5 is connected to the wireless base station 3 via a wireless network 4.

"The server 1 transmits image information and audio information to the wireless base station 3 via the wired network 2. The wireless base station 3 transfers to the wireless terminal 5, via the wireless network 4, the image information and the audio information transmitted from the server 1 to the wireless base station 3 via the wired network 2."

Figure 2:
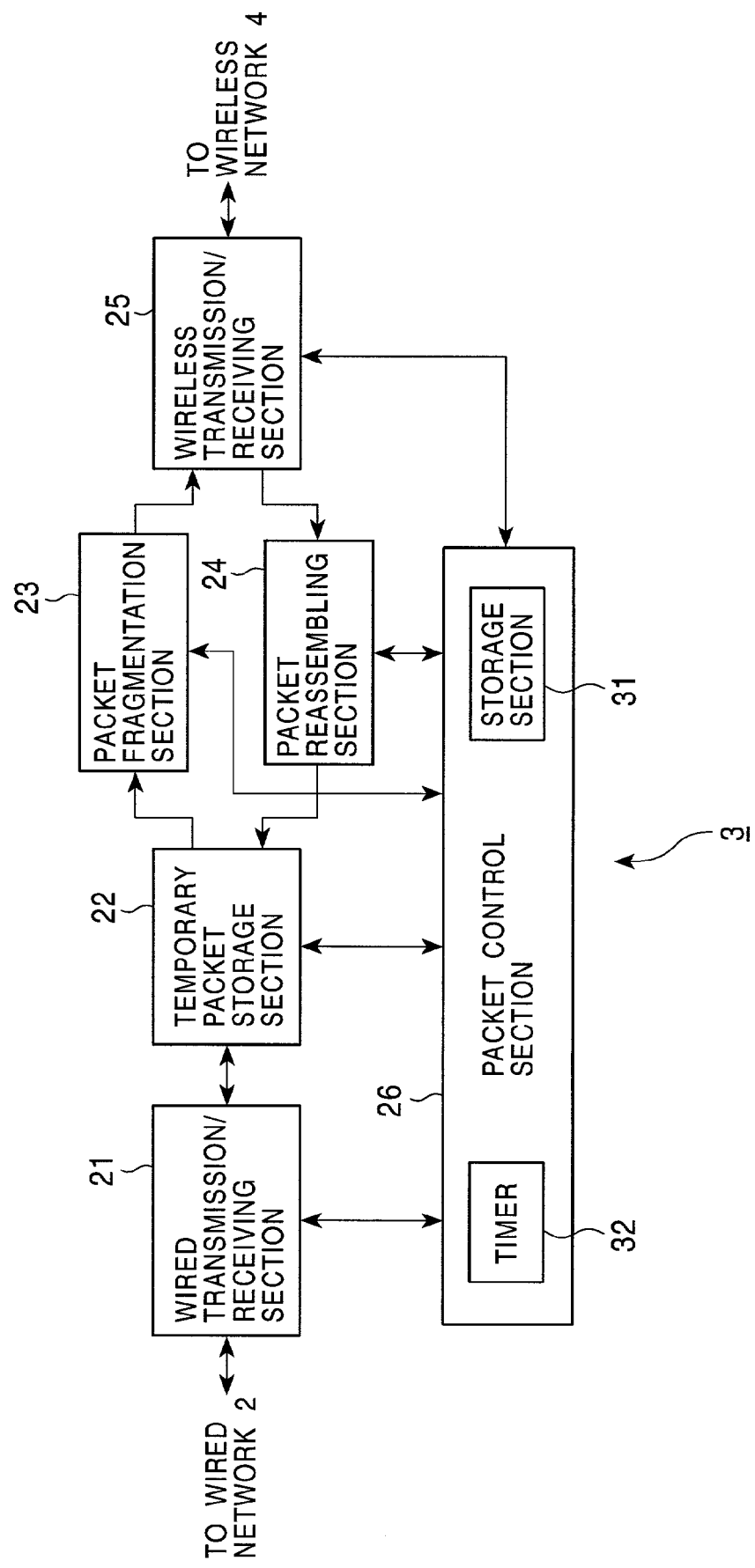
FIG. 2 is a block diagram showing an example of the construction of a wireless base station in FIG. 1.

The wireless base station 3 is constructed, for example, as shown in FIG. 2. A wired transmission/receiving section 21, connected to the wired network 2, receives information transmitted via the wired network 2, and supplies it to a temporary packet storage section 22. Furthermore, the wired transmission/receiving section 21 transmits the packet supplied from the temporary packet storage section 22 to the server 1 and other transmission parties via the wired network 2.

The temporary packet storage section 22 temporarily stores the packet supplied from the wired transmission/receiving section 21, and supplies it to a packet fragmentation section 23 as necessary. Furthermore, the temporary packet storage section 22 temporarily stores the packet supplied from a packet reassembling section 24, reads the packet as necessary, and supplies it to the wired transmission/receiving section 21.

The packet fragmentation section 23 divides the packet (in the case of this example, a large packet transmitted from the server 1 via the wired network 2 (this packet is hereinafter referred to as a "high-order layer packet")) supplied from the temporary packet storage section 22 into fragments, and supplies the fragmented packet to a wireless transmission/receiving section 25.

The wireless transmission/receiving section 25 transmits the fragmented packet supplied from the packet fragmentation section 23 to the wireless terminal 5 via the wireless network 4. Also, when the wireless transmission/receiving section 25 receives a packet transmitted from the wireless terminal 5 via the wireless network 4, the wireless transmission/receiving section 25 supplies this packet to the packet reassembling section 24.

The packet reassembling section 24 assembles small packets (corresponding to the fragmented packet) supplied from the wireless transmission/receiving section 25 to the wired network 2 into a large packet (high-order layer packet) to be transferred and supplies it to the temporary packet storage section 22.

A packet control section 26 controls the operation of the wired transmission/receiving section 21, the temporary packet storage section 22, the packet fragmentation section 23, the packet reassembling section 24, and the wireless transmission/receiving section 25. A storage section 31 incorporated into the packet control section 26 stores flags, the fragment numbers of packets, etc., which will be described later with reference to FIG. 4. Furthermore, a timer 32 incorporated into the packet control section 26 performs a clocking operation so as to clock the time from when one high-order layer packet is disassembled into one or more fragmented packets and these start to be transmitted.

Figure 3:
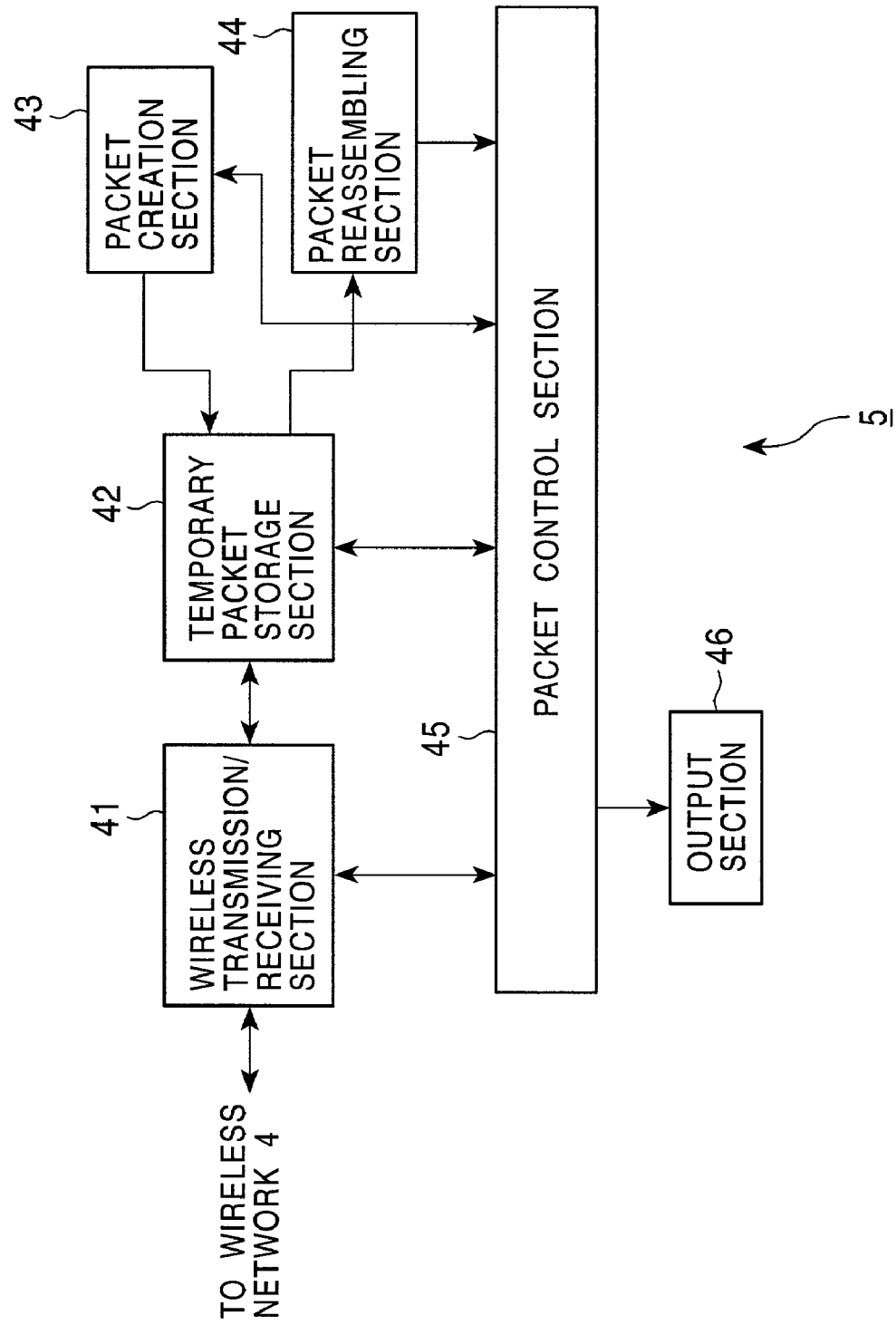
FIG. 3 is a block diagram showing an example of the construction of a wireless terminal in FIG. 1.

FIG. 3 shows an example of the construction of the wireless terminal 5. A wireless transmission/receiving section 41, connected to the wireless network 4, supplies a packet received from the wireless network 4 to a temporary packet storage section 42 and transmits a packet supplied from the temporary packet storage section 42 to the wireless network 4.

The temporary packet storage section 42 temporarily stores the fragmented packet supplied from the wireless transmission/receiving section 41, supplies it to a packet reassembling section 44, and temporarily stores the packet (packet corresponding to the fragmented packet) supplied from a packet creation section 43, and outputs it to the wireless transmission/receiving section 41.

The packet creation section 43 is controlled by a packet control section 45, creates a packet to be transmitted to the wireless network 4, and supplies it to the temporary packet storage section 42. The packet reassembling section 44 assembles the fragmented packet stored in the temporary packet storage section 42 in order to create a high-order layer packet, and outputs it to the packet control section 45.

The packet control section 45 appropriately processes the high-order layer packet supplied from the packet reassembling section 44, and outputs it to a display section formed of a CRT, an LCD or the like, or a sound producing section formed of a speaker, etc., so that that packet is displayed as an image or is output as sound.

In a case where connection is also made by wires so that, for example, real-time information is exchanged in both ways, the wireless terminal 5 can be constructed to be substantially similar to the wireless base station 3 of FIG. 2.

Next, the operation of the network system is described. When image information and audio information are to be transmitted to the wireless terminal 5, the server 1 divides the information into a high-order layer packet of a size suitable for the wired network 2, and transmits it to the wireless base station 3 via the wired network 2. The wireless base station 3 divides the high-order layer packet received from the server 1 via the wired network 2 into a fragmented packet of a smaller size, suitable for the wireless network 4, and transmits them to the wireless terminal 5 via the wireless network 4.

Next, this transmission process of the wireless base station 3 is described in more detail with reference to the flowchart in FIG. 4.

The high-order layer packet transferred from the server 1 via the wired network 2 is received by the wired transmission/receiving section 21 of the wireless base station 3. The wired transmission/receiving section 21 supplies the high-order layer packet received from the server 1 via the wired network 2 to the temporary packet storage section 22, so that it is stored therein.

In step S1, the packet control section 26 determines whether or not the high-order layer packet to be transmitted to the wireless terminal 5 is stored in the temporary packet storage section 22. When the high-order layer packet to be transmitted is not yet stored, the packet control section 26 waits until the packet is stored.

When it is determined in step S1 that the high-order layer packet to be transmitted is stored, the process proceeds to step S2, where the packet control section 26 controls the packet fragmentation section 23 in order to extract one high-order layer packet to be transmitted to the wireless terminal 5. In step S3, that packet is fragmented (divided) into fragmented packets of a smaller size suitable for the wireless network 4.

Next, in step S4, the packet control section 26 initializes the fragment number stored in the storage section 31 (the fragment number is set to "1").

In step S5, the packet control section 26 controls the timer 32 so that a clocking operation is started.

Next, in step S6, the packet control section 26 controls the packet fragmentation section 23 so that a sequence number is written into a sequence number field of the first fragmented packet.

Figure 5:
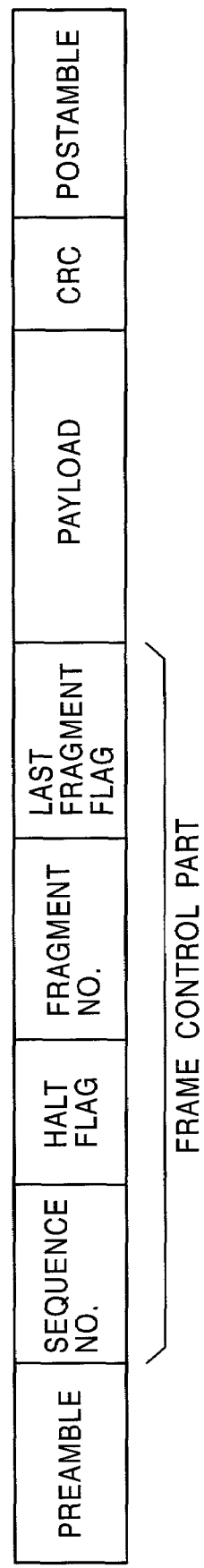
FIG. 5 shows the format of transmission data in a wireless network in FIG. 1.

More specifically, the format of the fragmented packet which is transmitted via the wireless network 4 is formed as shown in FIG. 5. A preamble is placed at the start thereof, and the sequence number field is placed next. In the preamble, information for creating a clock required to reproduce this fragmented packet, etc., is written. The sequence number is a number corresponding to the high-order layer packet transferred via the wired network 2. When one high-order layer packet in the wired network 2 is divided into a plurality of fragmented packets by the packet fragmentation section 23, the sequence numbers of the fragmented packets are given the same value. This sequence number is incremented by 1 according to the sequence of the high-order layer packet of the wired network 2.

A halt flag field is placed after the sequence number field. In this halt flag field, a halt flag is written as a result of the process of step S9 (to be described later). This halt flag indicates that the high-order layer packet prior to the high-order layer packet to which the fragmented packet in which the halt flag is written corresponds could not be transmitted completely.

After the halt flag field, a fragment number field is placed. In the fragment number field, a fragment number is placed. The fragment number indicates the sequence of the fragmented packet within the corresponding high-order layer packet.

After the fragment number field, a last fragment flag field is provided. In this last fragment flag field, a last fragment flag indicating whether or not this is the last fragmented packet within the corresponding high-order layer packet.

After a frame control part formed of the above sequence number, the halt flag, and the last fragment flag fields, a payload is placed. In this payload, image data and audio data as information which is transmitted as real content are stored. After the payload, a CRC (Cyclic Redundancy Check) as an error-detection code is placed. After the CRC, a postamble is placed.

Figure 4:
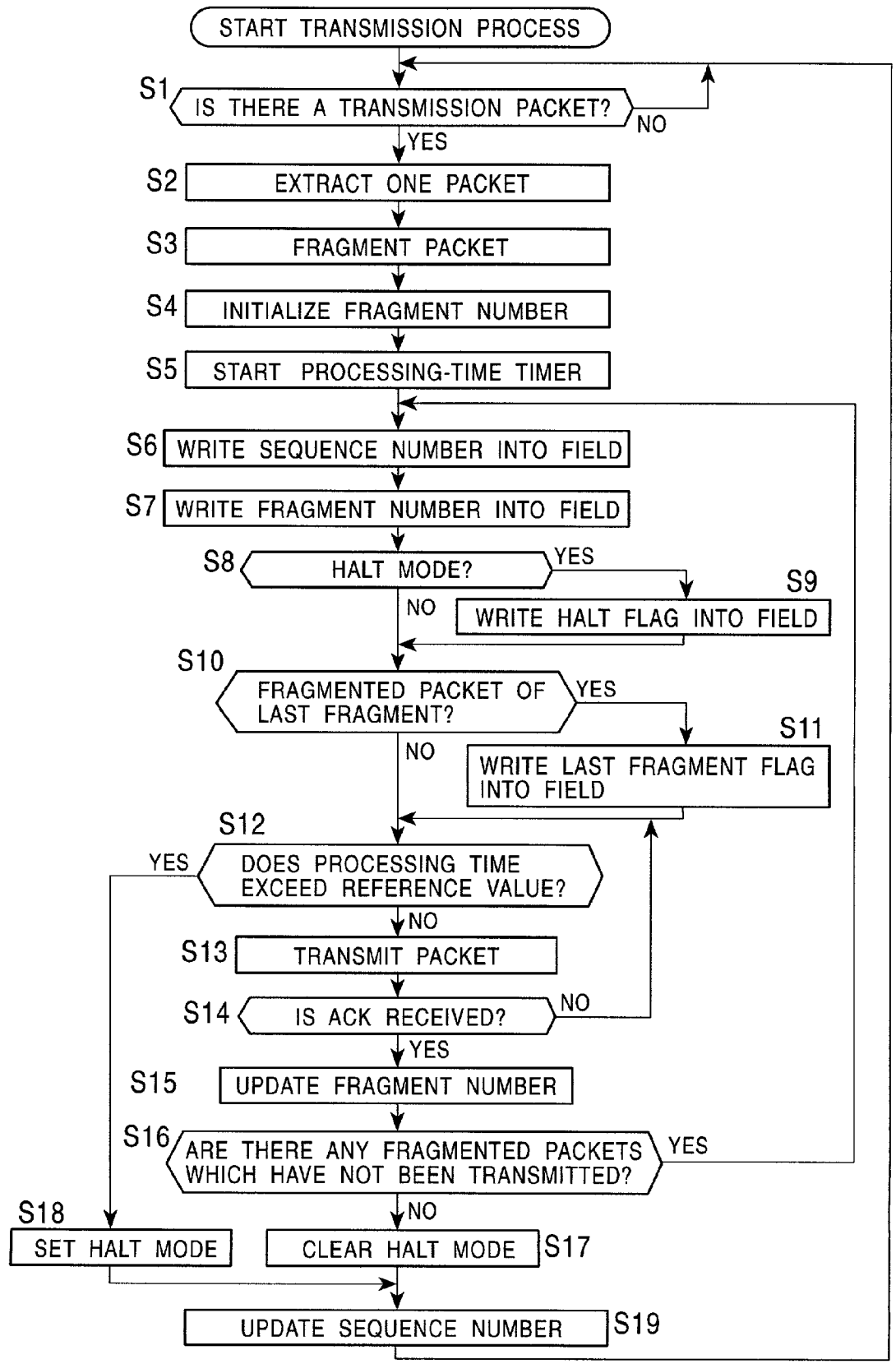
FIG. 4 is a flowchart illustrating a transmission process of the wireless base station in FIG. 1.

Referring back to the flowchart in FIG. 4, after, in step S6, the sequence number is written into the sequence number field, in step S7, the packet control section 26 controls the packet fragmentation section 23 so that the fragment number is written into the fragment number field. In this case, the fragment number=1 initialized in step S4 is written.

In step S8, the packet control section 26 determines whether or not the current mode is a halt mode. As will be described later, when the time from when the transmission process of one high-order layer packet is started (the time (processing time) clocked by the timer 32) exceeds a preset reference value, in step S18, a halt mode is set and is stored in the storage section 31. When the current mode is a halt mode, in step S9, the packet control section 26 writes a halt flag into the halt flag field. When it is determined in step S8 that the current mode is not a halt mode, the process of step S9 is skipped.

Next, in step S10, the packet control section 26 determines whether or not the fragmented packet which is currently a processing target is the fragmented packet of the last fragment. When the fragmented packet which is currently a processing target is the fragmented packet of the last fragment, the packet control section 26 proceeds to step S11, where the packet fragmentation section 23 is controlled to write the last fragment flag (the last fragment flag="YES") into the last fragment flag field. When it is determined in step S10 that the current fragmented packet is not the fragmented packet of the last fragment, the process of step S11 is skipped.

Next, in step S12, the packet control section 26 determines whether or not the time clocked by the timer 32 which started the clocking operation in step S5 exceeds a predetermined reference value which is set in advance. When the time from when the transmission process of one high-order layer packet is started exceeds the reference value, the packet control section 26 proceeds to step S18, where a halt mode is set as the current mode, and this is stored in the storage section 31. Thereafter, the process proceeds to step S19.

When it is determined in step S12 that the processing time does not exceed the reference value, the packet control section 26 proceeds to step S13, where the packet fragmentation section 23 is controlled to transmit that fragmented packet. That is, the packet fragmentation section 23 supplies the fragmented packet which is a processing target to the wireless transmission/receiving section 25, so that the packet is transmitted to the wireless terminal 5 via the wireless network 4.

As will be described later with reference to the flowchart in FIG. 7, when the wireless terminal 5 receives a fragmented packet, as a result of the process of step S33, an ACK signal is returned to the wireless base station 3 via the wireless network 4. When the wireless transmission/receiving section 25 receives this ACK signal, the wireless transmission/receiving section 25 reports it to the packet control section 26. When the fragmented packet is not received normally (that is, when the packet is not received at all or even if the packet is received, there is a CRC error in the received packet), the wireless terminal 5 does not return an ACK signal.

Therefore, in step S14, the packet control section 26 determines whether or not the ACK signal is received from the wireless terminal 5. When the ACK signal is not received, the process returns to step S12, where it is determined again whether the processing time exceeds the reference value. When the processing time does not exceed the reference value, the process proceeds to step S13, where the same fragmented packet is retransmitted. Then, in step S14, it is determined again whether the ACK signal is received from the wireless terminal 5. When the ACK signal is not received, the process returns to step S12 again, and the processes of this and subsequent steps are performed repeatedly. Then, when the processing time exceeds the reference value, the process proceeds to step S18 as described above, where the halt mode is set.

When it is determined in step S14 that the ACK signal is returned from the wireless terminal 5, the process proceeds to step S15, where the packet control section 26 updates (increments by 1) the fragment number stored in the storage section 31. In this case, the fragment number (=1) which is set in step S4 is updated to 2.

Next, the process proceeds to step S16, where the packet control section 26 determines whether or not there are any fragmented packets which have not yet been transmitted. When a fragmented packet which has not yet transmitted remains, the process returns to step S6, and the processes of this and subsequent steps are performed. That is, as a result, a process of transmitting the next fragmented packet corresponding to the same high-order layer packet is performed.

When it is determined in step S16 that a fragmented packet which is not yet transmitted does not exist, the process proceeds to step S17, where the packet control section 26 clears the halt mode which is set in the process of step S18. Thereafter, in step S19, the packet control section 26 updates the sequence number to a value which is larger by 1. This sequence number, as described above, is a number which is incremented for each high-order layer packet. Thereafter, the process returns to step S1, and the processes of this and subsequent steps are performed repeatedly.

Such processes are performed repeatedly for each high-order layer packet.

Although FIG. 4 shows a Stop and Wait ARQ method, a Go Back N ARQ method or a Selective Repeat ARQ method may be adopted.

Figure 6:
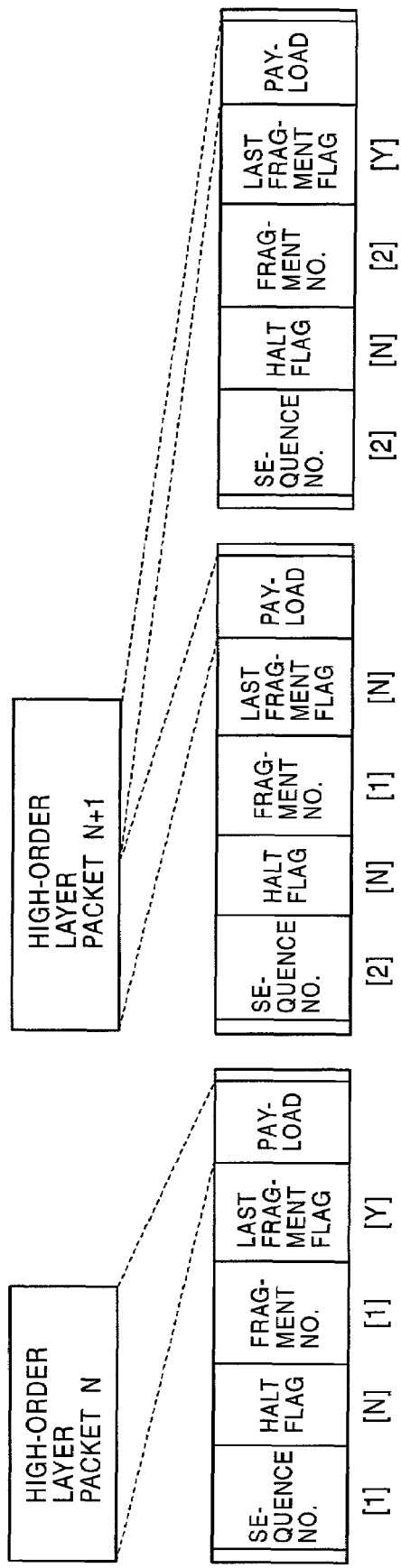
FIG. 6 illustrates the formation of a high-order layer packet into fragmented packets.

FIG. 6 shows an example in which, in this manner, a high-order layer packet is fragmented into fragmented packets and these are transmitted. In this example, a high-order layer packet N is transmitted as one fragmented packet. The sequence number of this fragmented packet is set to "1", the halt flag is set to "N (No)", the fragment number is set to "1", and the last fragment flag is set to "Y (YES)". Then, image data and audio data to be transmitted are placed in the payload thereof.

In this example, the high-order layer packet N+1 following the high-order layer packet N is formed into two fragmented packets. In the first fragmented packet, the sequence number thereof (corresponding to the high-order layer packet) is set to "2", the halt flag is set to "NO", the fragment number is set to "1", and the last fragment flag is set to "NO".

In the second fragmented packet corresponding to the high-order layer packet N+1, the sequence number is set to "2", the halt flag is set to "NO", and the fragment number is set to "2". That is, since this fragmented packet is the second fragmented packet in the high-order layer packet N+1, the fragment number is set to "2". Furthermore, in this high-order layer packet N+1, since this fragmented packet is the last fragmented packet, the last fragment flag is set to "YES".

Figure 7:
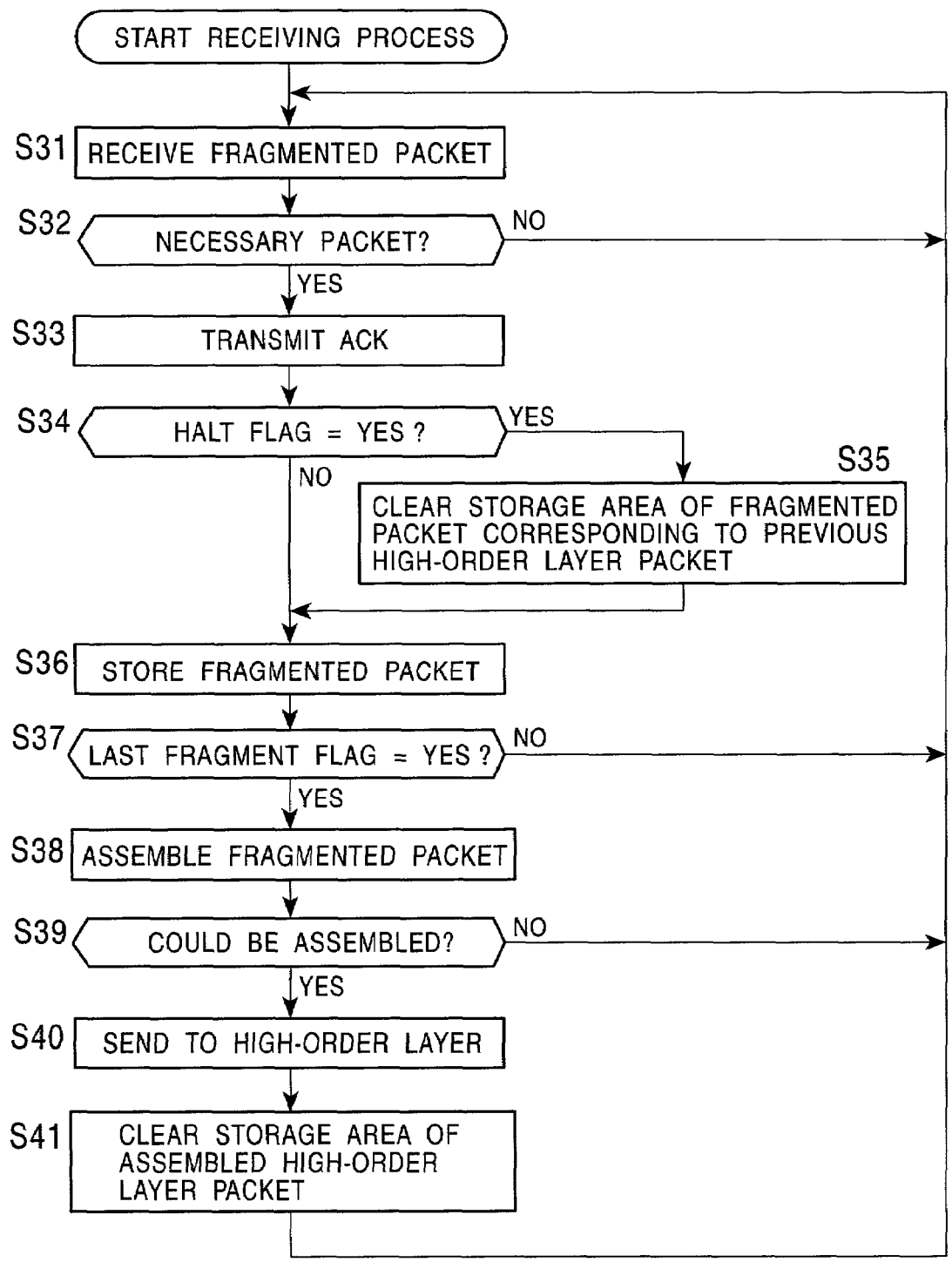
FIG. 7 is a flowchart illustrating a receiving process of the wireless terminal in FIG. 1.

Next, referring to the flowchart in FIG. 7, a description is given of a process of the wireless terminal 5 in a case where, in the above-described manner, a fragmented packet transmitted wirelessly from the wireless base station 3 via the wireless network 4 is received.

Initially, in step S31, the wireless transmission/receiving section 41 of the wireless terminal 5 receives a fragmented packet transmitted via the wireless network 4. The wireless transmission/receiving section 41 extracts the information of the frame control part of the received fragmented packet, and supplies it to the packet control section 45. The packet control section 45 reads destination information (not shown in FIG. 5) from within the information of the frame control part, and determines whether or not the fragmented packet is a packet transmitted to the wireless terminal 5 itself (whether or not it is a necessary packet). When the fragmented packet is not a packet transmitted to the wireless terminal 5 itself, the process returns to step S31, and the processes of this and subsequent steps are performed repeatedly.

In the process of step S32, even if the destination information indicates the wireless terminal 5 itself, when an error exists, the packet control section 45 determines that it is not a necessary packet.

When it is determined in step S32 that the currently received fragmented packet is a necessary packet, the process proceeds to step S33, where the packet control section 45 generates an ACK signal and outputs it to the packet creation section 43. The packet creation section 43 writes a control bit corresponding to the ACK signal into a position (not shown) of the format shown in FIG. 5, and outputs it to the wireless transmission/receiving section 41 via the temporary packet storage section 42. The wireless transmission/receiving section 41 transmits the packet supplied from the temporary packet storage section 42 to the wireless base station 3 via the wireless network 4.

In the manner described above, the presence or absence of this ACK signal is determined in the wireless base station 3 in step S14 of FIG. 4.

Next, in step S34, the packet control section 45 determines whether or not the halt flag contained in the frame control part indicates "YES". When the halt flag indicates "YES", the process proceeds to step S35, where the packet control section 45 clears (deletes) (allows the data of the payload of the fragmented packet corresponding to another high-order layer packet to be stored) the data (the data of the fragmented packet which forms an old high-order layer packet, stored in the process of step S36 (to be described later)) of the storage area of the temporary packet storage section 42 of the fragmented packet corresponding to the high-order layer packet, stored in the temporary packet storage section 42, which is prior to the high-order layer packet to which the currently received fragmented packet corresponds. When it is determined in step S34 that the halt flag does not indicate "YES" (when it is determined that the halt flag indicates "NO"), the process of step S35 is skipped.

Then, in step S36, the packet control section 45 causes the data of the payload of the fragmented packet, received by the wireless transmission/receiving section 41 in the process of step S31, to be stored in the storage area of the corresponding high-order layer packet of the temporary packet storage section 42.

Next, in step S37, the packet control section 45 determines whether or not the last fragment flag contained in the fragmented packet received in step S31 is "YES". When the last fragment flag is not "YES" (i.e., when it is "NO"), the process returns to step S31, and the processes of this and subsequent steps are performed repeatedly. That is, in this case, since, in addition to the currently received fragmented packet, another fragmented packet corresponding to the same high-order layer packet exists, the next fragmented packet is received, and the same processes are performed.

On the other hand, when it is determined in step S37 that the last fragment flag contained in the currently received fragmented packet indicates "YES", since all the fragmented packets which form the corresponding high-order layer packet have been received, the process proceeds to step S38, where the packet control section 45 controls the packet reassembling section 44 so that one corresponding high-order layer packet is assembled from the data of the payloads of one or more fragmented packets stored in the temporary packet storage section 42. In step S39, the packet control section 45 determines, from the output of the packet reassembling section 44, whether or not the high-order layer packet was successfully assembled by the packet reassembling section 44. When it is determined that the high-order layer packet could not be assembled, the process returns to step S31, and the processes of this and subsequent steps are performed repeatedly. That is, in this case, that high-order layer packet is lost.

When it is determined in step S39 that the high-order layer packet was successfully assembled, the process proceeds to step S40, where the packet control section 45 takes the high-order layer packet assembled by the packet reassembling section 44 and transfers it to the application program of the high-order layer. The application program processes the assembled high-order layer packet, and supplies it to an output section 46 as necessary. The display section which forms the output section 46 displays an image, and a speaker outputs sound.

In step S41, the packet control section 45 clears the data of the storage area corresponding to the high-order layer packet which is assembled completely within the storage area of the temporary packet storage section 42. Thereafter, the process returns to step S31, where the processes of this and subsequent steps are performed repeatedly.

Figure 8:
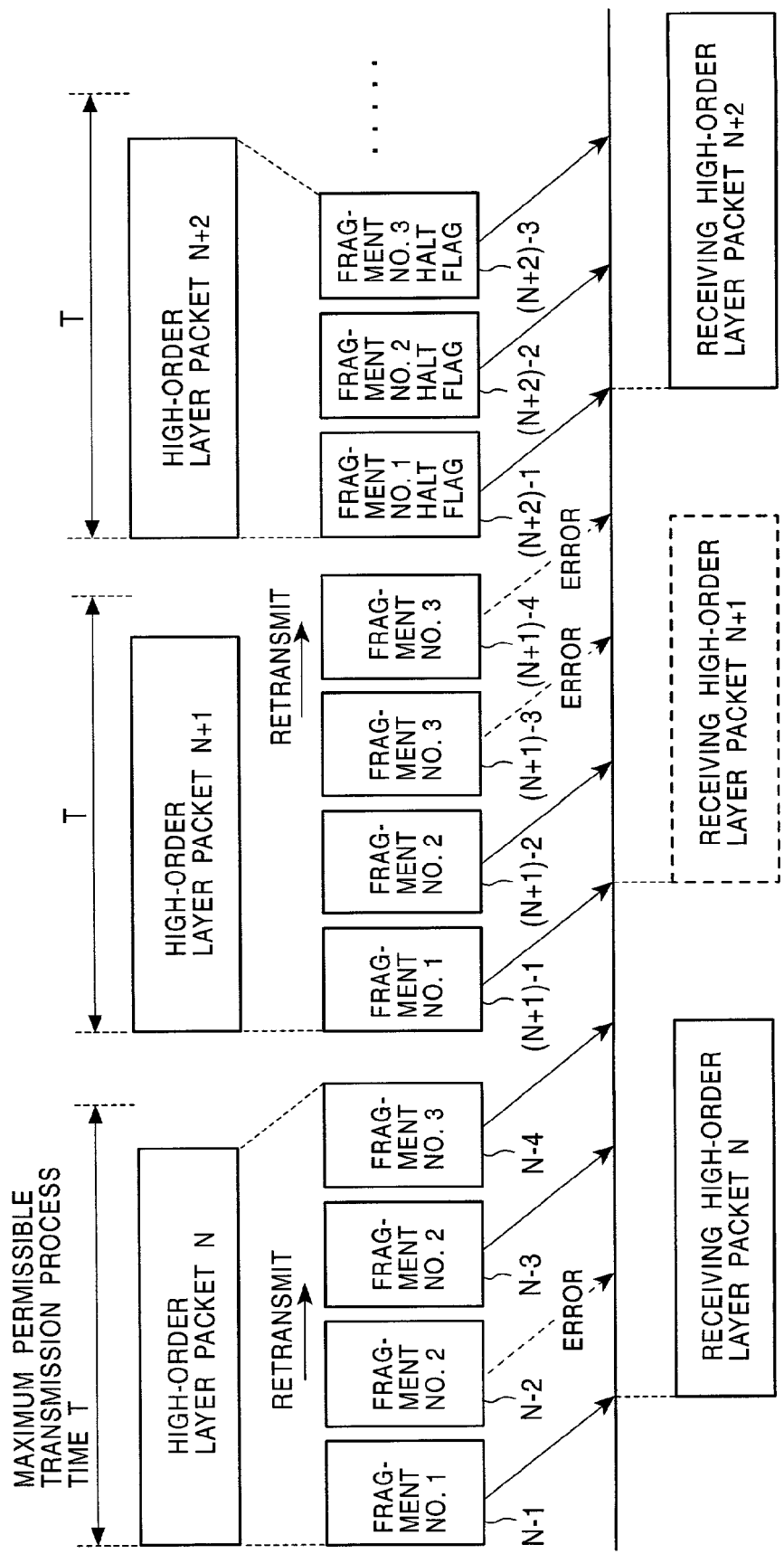
FIG. 8 illustrates a process of assembling a corresponding high-order layer packet from the transmitted fragmented packets.

FIG. 8 shows an example in which, in the above-described manner, a high-order layer packet is divided into fragments and the transmitted fragmented packets are received. In this example, in step S12 of FIG. 4, a maximum permissible transmission process time as a reference value which is a determination criterion of the processing time from when the transmission process of the high-order layer packet is started is represented as T (this time T may be set to a different value for each packet).

The first high-order layer packet N to be transmitted is divided into three fragmented packets of fragment numbers 1 to 3. The fragmented packet N–1 of fragment number 1 could be transmitted to the wireless terminal 5. However, for the fragmented packet N–2 of fragment number 2, an error occurred during the first transmission, and the packet could not be transmitted to the wireless terminal 5. Therefore, the packet is retransmitted as a fragmented packet N–3. The fragmented packet of fragment number 3 is transmitted as a fragmented packet N–4. The transmission process of the fragmented packets N–1 to N–4 has been completed within the time T.

The wireless terminal 5 receiving these fragmented packets N–1, N–3, and N–4 assembles the corresponding high-order layer packet N therefrom.

In comparison, the high-order layer packet N+1 to be transmitted next is divided into three fragmented packets of fragment numbers 1 to 3. The fragmented packet (N+1)–1 of fragment number 1 and the fragmented packet (N+1)–2 of fragment number 2 are transmitted normally. Since an error occurred in the fragmented packet (N+1)–3 of fragment number 3, this packet was retransmitted as a fragmented packet (N+1)–4, in which an error also occurs. As a result, for the high-order layer packet N+1, all the fragmented packets which form it cannot be transmitted within the time T. As a result, the wireless terminal 5 cannot assemble the high-order layer packet N+1.

Accordingly, in the following high-order layer packet N+2, a halt flag is written into the halt flag fields from the fragmented packet (N+2)–1 to the fragmented packet (N+2)–3 (the halt flag (=YES) is written). As a result, in the manner described above, in step S34 of FIG. 7, in the processes of the fragmented packets (N+2)–1 to (N+2)–3, it is determined that the halt flag is "YES". In step S35, the data of the storage areas of the fragmented packet (N+1)–1 and the fragmented packet (N+1)–2 corresponding to the high-order layer packet N+1 prior to the current high-order layer packet N+2 is cleared. As a consequence, the wasteful consumption (use) of the storage area of the temporary packet storage section 42 for a long period of time more than is required is prevented.

Furthermore, since the transmission process of the fragmented packets of the high-order layer packet N+1 is not performed repeatedly beyond the time T, real-time characteristics of the high-order layer packet N+2 after that can be ensured.

Although the series of the above-described processes can be performed by hardware, it can also be performed by software. In this case, for example, the wireless base station 3 is formed by a personal computer such as that shown in FIG. 9.

Figure 9:
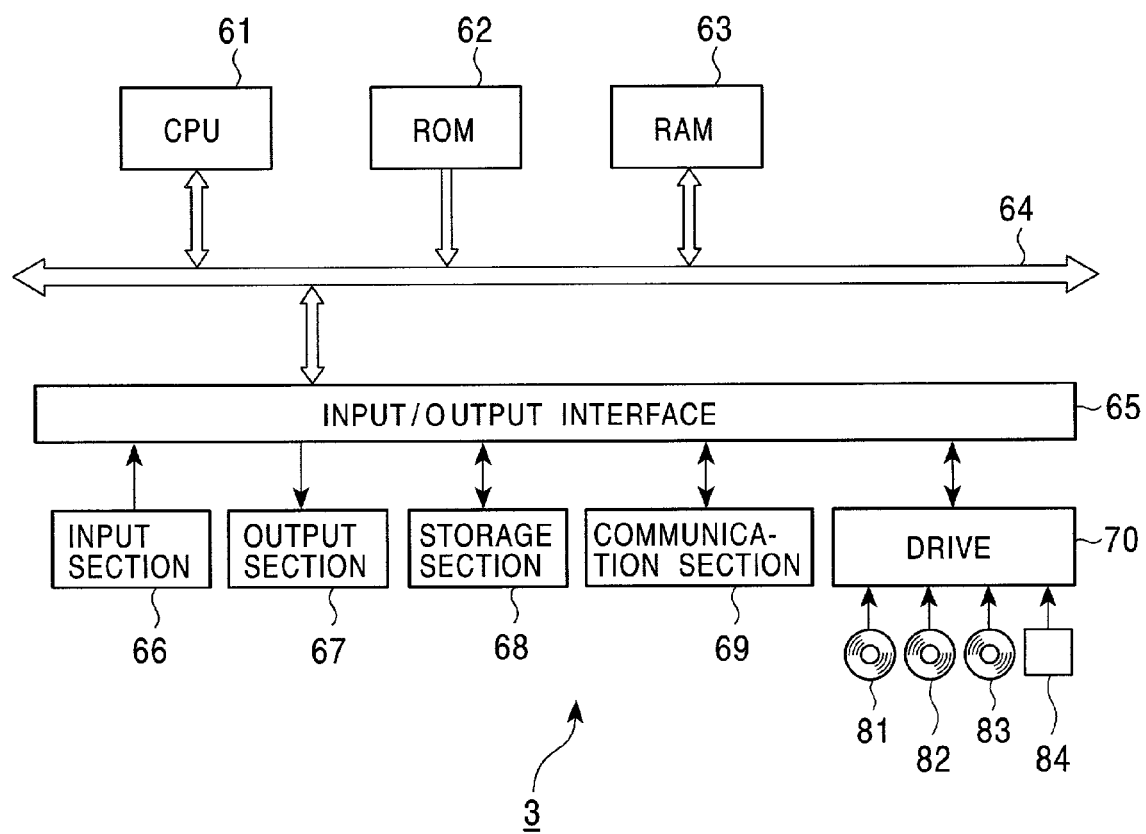
FIG. 9 is a block diagram showing another example of the construction of the wireless base station in FIG. 1.

In FIG. 9, a CPU (Central Processing Unit) 61 performs various processes in accordance with a program stored in a ROM (Read Only Memory) 62 or a program loaded from a storage section 68 into a RAM (Random Access Memory) 63. In the RAM 63, also, data required for the CPU 61 to perform various processes, etc., are stored as appropriate.

The CPU 61, the ROM 62, and the RAM 63 are interconnected to each other via a bus 64. Also, an input/output interface 65 is connected to this bus 64.

An input section 66 formed of a keyboard, a mouse, etc., an output section 67 formed of a display formed by a CRT, an LCD or the like, a speaker, etc., a storage section 68 formed of a hard disk, etc., and a communication section 69 formed of a modem, a terminal adapter, etc., are connected to the input/output interface 65. The communication section 69 corresponds to the wired transmission/receiving section 21 and the wireless transmission/receiving section 25 in FIG. 2.

Furthermore, a drive 70 is connected as necessary to the input/output interface 65, and a magnetic disk 81, an optical disk 82, a magneto-optical disk 83, or a semiconductor memory 84 is loaded thereinto as appropriate, and a computer program read therefrom is installed into the storage section 68 as necessary.

In a case where a series of processes is to be performed by software, although not shown, the wireless terminal 5 can also be formed similarly to the wireless base station 3.

In a case where a series of processes is performed by software, programs which form the software are installed from a network or a recording medium into a computer incorporated into dedicated hardware or into, for example, a general-purpose personal computer capable of executing various types of functions by installing various programs.

This recording medium, as shown in FIG. 9, is constructed by not only packaged media formed of the magnetic disk 81 (including a floppy disk), the optical disk 82 (including a CD-ROM (Compact Disk-Read Only Memory), and a DVD (Digital Versatile Disk)), the magneto-optical disk 83 (including an MD (Mini-Disk)), or the semiconductor memory 84, in which programs are recorded and which is distributed separately from the main unit of the apparatus so as to distribute programs to a user, but also is constructed by the ROM 62, a hard disk contained in the storage section 68, etc., in which programs are recorded and which is distributed to a user in a state in which it is incorporated in advance into the main unit of the apparatus.

In this specification, steps which describe a program recorded in a recording medium contain not only processes performed in a time-series manner along the described sequence, but also processes performed in parallel or individually although the processes are not necessarily performed in a time-series manner.

In this specification, the system represents the overall apparatus composed of plural devices.

What is claimed is:

1. An information processing apparatus for transmitting information to a transmission party via a network in predetermined information units, said information processing apparatus comprising:
   a first dividing unit for dividing a first information into a first set of information units;
   a first transmission unit for transmitting said first set of information units to said transmission party through said network;
   a receiving unit for receiving, from said transmission party, indication about the reception of said first set of information units transmitted by said first transmission unit;
   a clocking unit for clocking a time from when transmission of said first set of information units is initiated;
   a determination unit for determining whether or not the time clocked by said clocking unit exceeds a reference time value associated with said first set of information units;
   a second dividing unit for dividing a second information, which follows said first information, into a second set of information units;
   a second transmission unit for transmitting said second set of information units to said transmission party through said network when said indication is received or when said indication is not received within said reference time value;
   a setting unit for setting a flag indicating that the time clocked by said clocking unit exceeds said reference time value when determined by said determination unit and that the transmission of said first set of information units is cancelled; and
   a writing unit for writing said flag into each of said second set of information units which are transmitted by said second transmission unit when said flag is set by said setting unit.

2. An information processing apparatus according to claim 1, wherein said first and second information comprise information packets and said first set of information units and said second set of information units comprise information fragments.

3. An information processing apparatus according to claim 1, further comprising:
   a clearing unit for clearing said flag when all of said second set of information units which form said second information are transmitted to said transmission party.

4. An information processing method for use with an information processing apparatus for transmitting information to a transmission party via a network in predetermined information units, said information processing method comprising:
   a first dividing step for dividing a first information into a first set of information units;
   a first transmission step of transmitting said first set of information units to said transmission party through said network;
   a receiving step of receiving, from said transmission party, indication about the reception of said first set of information units transmitted in said first transmission step;
   a clocking step for clocking a time from when transmission of said first set of information units is initiated
   a determination step for determining whether or not the time clocked in said clocking step exceeds a reference time value associated with said first set of information units;
   a second dividing step for dividing a second information, which follows said first information, into a second set of information units;
   a second transmission step of transmitting said second set of information units to said transmission party through said network when said indication is received or when said indication is not received within said reference time value; and
   a setting step for setting a flag indicating that the time clocked in said clocking step exceeds said reference time value when determined in said determination step and that the transmission of said first set of information units is cancelled; and
   a writing unit for writing said flag into each of said second set of information units which are transmitted by said second transmission unit when said flag is set by said setting unit.

5. A computer-readable medium encoded with a computer-readable program in a case where a computer controls an operation of transmitting information to a transmission party via a network in predetermined information units, said program comprising instructions for:
   a first dividing step for dividing a first information into a first set of information units;
   a first transmission step of transmitting said first set of information units to said transmission party through said network;
   a receiving step of receiving, from said transmission party, indication about the reception of said first set of information units transmitted in said first transmission step;
   a clocking step for clocking a time from when transmission of said first set of information units is initiated
   a determination step for determining whether or not the time clocked in said clocking step exceeds a reference time value associated with said first set of information units;
   a second dividing step for dividing a second information, which follows said first information, into a second set of information units;
   a second transmission step of transmitting said second set of information units to said transmission party through said network when said indication is received or when said indication is not received within said reference time value; and
   a setting step for setting a flag indicating that the time clocked in said clocking step exceeds said reference time value when determined in said determination step and that the transmission of said first set of information units is cancelled; and
   a writing unit for writing said flag into each of said second set of information units which are transmitted by said second transmission unit when said flag is set by said setting unit.

6. An information processing apparatus for receiving an information packet, transmitted through a network, said information packet being divided into information fragments, said information processing apparatus comprising:

a receiving unit for receiving said information fragments via said network;

a storage unit for storing each of said information fragments received by said receiving unit;

an assembling unit for assembling said information fragments stored in said storage unit to reproduce said information packet;

a first deletion unit for deleting each of said information fragments, stored in said storage unit, when said information fragments are assembled to reproduce said information packet by said assembling unit;

a determination unit for determining whether or not a predetermined flag is contained in said information fragments received by said receiving unit; and a second deletion unit for deleting said information fragments stored in said storage unit, corresponding to said information packet which is immediately prior to another transmitted information packet whose corresponding another information fragments are determined to contain flags, wherein, said flags are indicative that a clocked transmission time of said information fragments exceeds a reference time value and that the transmission of said information fragments is cancelled.

7. An information processing method for use with an information processing apparatus for receiving an information packet, transmitted through a network, said information packet being divided into information fragments, said information processing method comprising:

a receiving step of receiving said information fragments;

a storing step of storing, for each of said information fragments received in said receiving step;

an assembling step of assembling said information fragments, stored in said storing step, into said information packet;

a first deletion step of deleting each of said information fragments, stored in said storing step, when said information fragments are assembled to reproduce said information packet in said assembling step;

a determination step of determining whether or not a predetermined flag is contained in said information fragments received in said receiving step; and a second deletion step of deleting said information fragments, stored in said storing step, corresponding to said information packet which is immediately prior to another transmitted information packet whose corresponding another information fragments are determined to contain flags, wherein, said flags are indicative that a clocked transmission time of said information fragments exceeds a reference time value and that the transmission of said information fragments is cancelled.

8. A computer-readable medium encoded with a computer-readable program for causing a computer to perform an operation of receiving an information packet, transmitted through a network, said information packet is divided into information fragments, said information processing method comprising:

a receiving step of receiving said information fragments;

a storing step of storing, for each of said information fragments received in said receiving step;

an assembling step of assembling said information fragments, stored in said storing step, into said information packet;

a first deletion step of deleting each of said information fragments, stored in said storing step, when said information fragments are assembled to reproduce said information packet in said assembling step;

a determination step of determining whether or not a predetermined flag is contained in said information fragments received in said receiving step; and a second deletion step of deleting said information fragments, stored in said storing step, corresponding to said information packet which is immediately prior to another transmitted information packet whose corresponding another information fragments are determined to contain flags, wherein, said flags are indicative that a clocked transmission time of said information fragments exceeds a reference time value and that the transmission of said information fragments is cancelled.

9. An information processing apparatus according to claim 1, wherein, the first transmission unit retransmits a unit of said first information units when said determination unit determines that the time clocked by said clocking unit does not exceed said reference value in a case where said indication received by said receiving unit indicates that said transmission party has not yet received said unit of said information units.

10. An information processing method according to claim 4, wherein, a unit of said first information units is retransmitted when the time clocked by said clocking unit is determined not to exceed said reference value in a case where said indication received by said receiving unit indicates that said transmission party has not yet received said unit of said first set of information units.

11. A computer-readable medium having recorded thereon encoded with a computer-readable program according to claim 5, wherein, a unit of said first set of information units is retransmitted when the time clocked by said clocking unit is determined not to exceed said reference time value in a case where said indication received by said receiving unit indicates that said transmission party has not yet received said unit of said first set of information units.

12. An information processing apparatus according to claim 1, wherein said first and/or second information units include a clock information for creating a time required to reproduce said first and/or second information units.

* * * * *